UNITED STATES PATENT OFFICE.

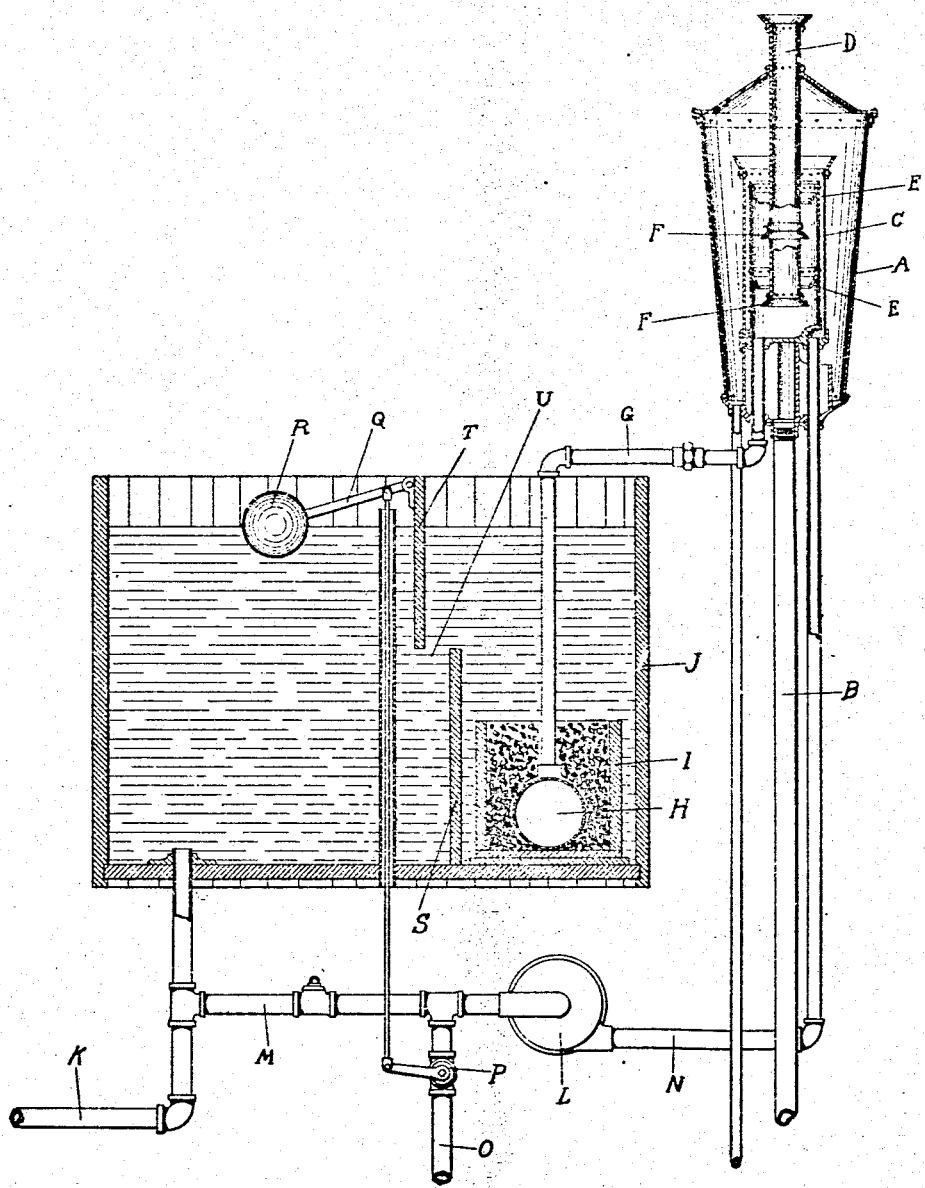

CHAPIN A. CARTWRIGHT, OF CHICAGO, ILLINOIS, ASSIGNOR OF ONE-HALF TO JOHN E. CAPS, OF CHICAGO, ILLINOIS.

WATER-HEATING SYSTEM.

No. 918,961.      Specification of Letters Patent.      Patented April 20, 1909.

Application filed April 22, 1908. Serial No. 428,599.

*To all whom it may concern:*

Be it known that I, CHAPIN A. CARTWRIGHT, citizen of the United States, residing at Chicago, in the county of Cook and State of Illinois, have invented certain new and useful Improvements in Water-Heating Systems; and I do hereby declare the following to be a full, clear, and exact description of the invention, such as will enable others skilled in the art to which it appertains to make and use the same.

This invention relates to a novel construction in a water heating system, the object being to provide a system whereby water in relatively great quantity is brought in direct contact with exhaust steam to absorb the heat of the latter and at the same time condense it, and consists in the features of construction and combinations of parts hereinafter fully described and claimed.

The accompanying drawing illustrating my invention shows the hot water tank and the exhaust steam hood in vertical section, the piping and other devices constituting a part of the system being shown in elevation.

In practically all power plants it is the practice now of condensing the exhaust steam by means of water with which it is brought in direct contact and becomes admixed, the heat of the steam serving to heat the water, the latter being used to feed the boilers and supply hot water service in the building. The hot water is contained in a special tank from which, generally, it is drained by gravity and in which a constant level is maintained or sought to be maintained in any well known manner. In all systems which, to my knowledge, are now in general use only the water introduced to replenish the supply in the tank at necessary intervals or where a constant drain takes place, constantly replenishing the supply, is brought into contact with and is heated by the exhaust steam. Such water is generally introduced from the service pipes, street main or well, and is relatively cold. Furthermore such water is brought into contact with and is heated only at the time that it is introduced, hence, any interruption or variation in the constancy of the supply is reflected in variations in temperature of the replenishing water and in resultant loss of steam.

The object of my present invention is to provide simple and efficient means for maintaining a constant supply of water through the condenser irrespective of the consumption of the hot water whereby I effect not only great economy of steam but also provide a supply of water of very much higher and more uniform temperature than is supplied by other systems.

A further object of my invention is to provide means for purifying said water by filtration and more particularly by maintaining the temperature thereof so high and so directing its flow as to cause and permit precipitation of certain mineral ingredients held in solution or in suspension in solid form in the water whereby greater cleanliness of boilers is assured and which further serves to soften the water thus better adapting it for use in laundries and for all cleansing purposes.

My said system includes the condenser —A— of any suitable construction into which exhaust steam passes from the pipe —B—, said steam being caused to circulate horizontally therein so as to separate the oil therefrom before contact with the condensing water, such means being variously exemplified in systems now in use. Water is introduced into the upper portion of the condenser and flows into the path of steam endeavoring to find its way out, this being likewise accomplished in any suitable manner. In the instance illustrated the steam enters the lower portion of the condenser —A— and is deflected horizontally so as to whirl therein and pass spirally into the upper portion. Centrally disposed in said condenser is a cup —C— having a double peripheral wall and which is open at its upper end. The outlet pipe —D— passing through the top of the condenser projects at its lower end centrally into said cup, the latter and said outlet pipe being equipped with deflecting plates —E— and —F— which serve to cause the water and steam to take a zig-zag course through the annular space between the inner wall of the cup and said outlet pipe —D—. The water enters the annular space between the two walls of the cup —C— and overflows the upper edge of the inner wall thereof and is drained from said cup through the pipe —G—. The latter is connected at its delivery end with a small tank —H— disposed in a filtering box —I— contained in the bottom of the hot water tank —J—, said tank —H— being perforated so that water passing therefrom must pass through the filtering material in the said box —I— before admixing with the body of water contained in said tank —J—. Water is drained from the latter through the service pipe —K— equipped at its various outlets with valves and said pipe —K— is connected between its ends with the inlet end of a pump —L— by means of the pipe —M—, the delivery end of said pump being connected with the pipe —N— entering the annular space between the double walls of the cup —C—. The supply pipe —O— connecting with the city main, well or other source of supply, is connected with said pipe —M— between the ends of the latter, the valve —P— interposed in the pipe —O— being operatively connected with the lever —Q— carrying the float —R— and constituting substantially a ball-cock control for the water supply. The said pump —L— is maintained constantly in operation thus not only maintaining the supply to the condenser constant but also causing the water to be again and again brought into contact with and condense the exhaust steam thereby heating the entire body of water contained in the tank to a substantially uniform and high temperature, the latter being preferably maintained sufficiently high to cause precipitation of magnesia and other mineral substances whereby the water is softened.

The manner of returning the water to the tank —J— is also an important feature of the invention for the reason that the hottest water is caused to enter at the lower portion of the said tank and is so distributed and retarded by the filtering material through which it passes as to obviate undue agitation of the water body, such agitation being a preventive to settlement to the bottom of any solids contained in the water including the minerals solidified by the heat. To further prevent settling or precipitation of solids the said tank —J— is divided by partition walls —S— and —T—, the former resting on the bottom and extending about one-half the height of the tank and the other depending and being offset from the wall —S— so as to provide a slot —U— through which the water is forced to pass from the admission to the outlet chamber of the said tank —J—, said walls —S— and —T— being preferably relatively so disposed as to cause a downward flow of the water into the outlet chamber, such direction of flow being commonly resorted to for the purpose of promoting precipitation.

I claim as my invention:

1. A water heating system comprising a steam condensing chamber, a storage tank for water, connection between said storage tank and said condenser, a pump interposed in said connection, a drain pipe leading from the said condenser to said storage tank, said pump serving to maintain an excessive supply of water to said condenser irrespective of volume or pressure of the exhaust steam, whereby condensation of all steam and a uniform temperature of all water in the storage tank is assured.

2. A water heating system comprising a steam condensing chamber, a storage tank for water, connection between said storage tank and said condenser, a pump interposed in said connection, a drain pipe leading from the said condenser to the bottom portion of said storage tank, said pump serving to maintain an excessive supply of water to said condenser irrespective of volume or pressure of the exhaust steam, whereby condensation of all steam and a uniform temperature of all water in the storage tank is assured.

3. A water heating system comprising a condenser for exhaust steam, a storage tank for water, a pipe leading from the bottom of the storage tank to the condenser, a pump interposed in said pipe, a supply pipe connected with said pipe, a valve in said supply pipe a float actuated by variations in the water level said tank controlling said valve, and a drain pipe leading from the said condenser to said tank.

4. A water heating system comprising a condenser for exhaust steam, a storage tank having an outlet to the service pipes to supply hot water, a pipe connecting said outlet with said condenser, a pump interposed in said pipe, a supply pipe connecting with said pipe, and a drain pipe leading from said condenser to said storage tank.

5. A water heating system comprising a condenser for exhaust steam, a storage tank for water, a pipe leading from the bottom of the storage tank to the condenser, a pump interposed in said pipe, a supply pipe connected with said pipe, a valve in said supply pipe a float actuated by variations in the water level in said tank controlling said valve and a drain-pipe leading from the said condenser to the bottom portion of said tank.

6. A water heating system comprising a condenser for exhaust steam, a storage tank for water, a pipe leading from the bottom of the storage tank to the condenser, a pump interposed in said pipe, a supply connected with said pipe, a valve in said supply pipe, a float actuated by variations in the water level of said tank controlling said valve, and a drain-pipe leading from the said condenser to the bottom portion of the said tank and a partition wall in said tank between the inlet thereto and outlet thereof provided with a slot between its ends through which the water passes to the outlet.

7. A water heating system comprising a condenser for exhaust steam, a storage tank for water, a pipe leading from a point adjacent the bottom of said tank to said condenser, a pump interposed in said pipe, and maintaining a constant supply of water to said condenser a drain-pipe leading from the said condenser to a point adjacent the bottom of said tank, a partition wall in said tank between the inlet and outlet therefrom and resting on the bottom of said tank, and a deflecting wall in the upper portion of said tank adjacent said partition wall, said deflecting wall serving to break the flow of water and deflect the same downwardly as it passes toward the outlet to accelerate precipitation of solid particles suspended therein.

In testimony whereof I have signed my name in the presence of two subscribing witnesses.

CHAPIN A. CARTWRIGHT.

Witnesses:
  RICH. P. COFFIN,
  RUDOLPH WM. LOTZ.